United States Patent [19]

Kawana

[11] Patent Number: 4,697,072

[45] Date of Patent: Sep. 29, 1987

[54] IDENTIFICATION CARD AND AUTHENTICATION SYSTEM THEREFOR

[75] Inventor: Shigeyuki Kawana, Tokyo, Japan

[73] Assignee: Casio Computer Co., Ltd., Tokyo, Japan

[21] Appl. No.: 769,872

[22] Filed: Aug. 27, 1985

[30] Foreign Application Priority Data

Sep. 7, 1984 [JP] Japan .................. 59-187406

[51] Int. Cl.$^4$ .............................................. G06K 5/10
[52] U.S. Cl. .................................... 235/380; 235/379
[58] Field of Search ............................... 235/379, 380

[56] References Cited

U.S. PATENT DOCUMENTS 3,906,460  9/1975  Halpern.
4,105,156  8/1978  Dethloff.
4,529,870  7/1985  Chaum ................................ 235/379

Primary Examiner—Harold I. Pitts
Attorney, Agent, or Firm—Frishauf, Holtz, Goodman & Woodward

[57] ABSTRACT

A card holder inputs personal identification number (PIN') data as secret data and transaction data (AMT) in an LSI in an identification card through a keyboard. The LSI calculates encrypted data (SAN) in accordance with the input data (PIN' and AMT). The encrypted data (SAN) is shown by the card holder to a cashier at a point-of-sales (POS) terminal. The POS terminal performs authentication of the card and the card holder in accordance with the encrypted data (SAN).

15 Claims, 6 Drawing Figures

IDENTIFICATION CARD AND AUTHENTICATION SYSTEM THEREFOR

BACKGROUND OF THE INVENTION

The present invention relates to an identification card and an authentication system for authenticating a card holder and the identification card itself.

Recently, desired items can be purchased without cash but with cards issued from card issuers such as credit card companies. At time of purchasing, a store clerk checks whether or not a card user or customer is the authorized card holder, i.e., whether or not the card is being misused by the current card user. When the card user is authenticated as the legal card holder, the selected item is sold with the identification card. In this case, the card user is authenticated with a key code in the following manner.

(a) A key code is recorded in a magnetic strip of the identification card. An input key code entered by a customer at a keyboard of an authentication system installed in a store is compared with the recorded key code by a magnetic reader so as to detect a coincidence therebetween.

(b) A key code entered by a customer is compared with that registered by a credit card company through a POS (point of sales) terminal or a telephone set which is on-line connected to a host system in the credit card company so as to detect a coincidence therebetween.

According to method (a), however, an illegal user can easily read out the key code from the magnetic strip by using a special magnetic reader or the like. Authentication reliability with respect to the card holder is very low. An IC card storing a key code has recently been developed and the key code cannot be externally read out from the IC card. Although it is difficult to read out the key code from this type of IC card, the card itself can be counterfeited and the legal card holder cannot be positively identified. It is difficult to confirm that the IC card was issued in accordance with proper procedures.

On the other hand, method (b) has high reliability for authenticating the card itself. However, since a communication line must be used, the key code may be intercepted, thus failing to guarantee security (safety) of the key code.

SUMMARY OF THE INVENTION

The present invention has been made in consideration of the above situation, and has as its object to provide an identification card and an authentication system therefor, wherein a card holder and the card itself can be properly authenticated.

According to the present invention, a device is arranged in an identification card to encrypt input data entered by a card holder in accordance with a specific encryption algorithm. The data encrypted by the device is discriminated to determine whether or not it is a data obtained by an authentic encryption algorithm approved by a card issuer such as a credit card company. Authenticity of the card holder and the identification card itself can thus be confirmed.

DETAILED DESCRIPTION OF THE PREFERRED EMBODIMENT

The present invention will be described in detail with reference to a preferred embodiment in conjunction with the accompanying drawings.

Figure 1:
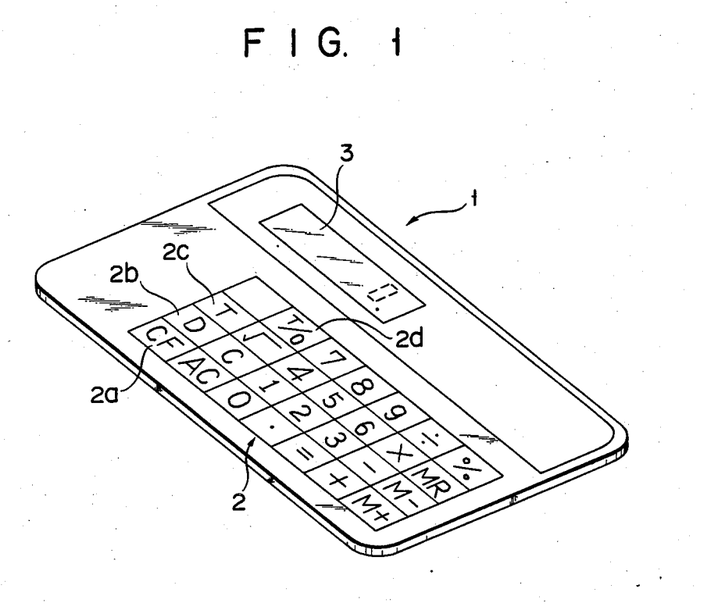
FIG. 1 is a perspective view of an identification card according to an embodiment of the present invention.

Referring to FIG. 1, an identification card 1 has the same outer dimensions as a normal credit card. The card 1 has a measure of 54 mm $\times$ 85 mm $\times$ 0.8 mm to comply with the ISO standards. A data input keyboard 2 and a liquid crystal display unit 3 are formed on the surface of the card 1. An LSI (not shown) is incorporated in the card 1. A card holder's name, an account number and the like are embossed on the plastic lower surface of the card 1. A paper like cell is incorporated in the body of the card 1.

The keyboard 2 has a ten-key pad and function keys in the same manner as a conventional compact calculator. The keyboard 2 also has an collation function (CF) key 2a, a date (D) set key 2b, a time (T) set key 2c, a time/date selector (T/D) key 2d and the like.

Figure 2:
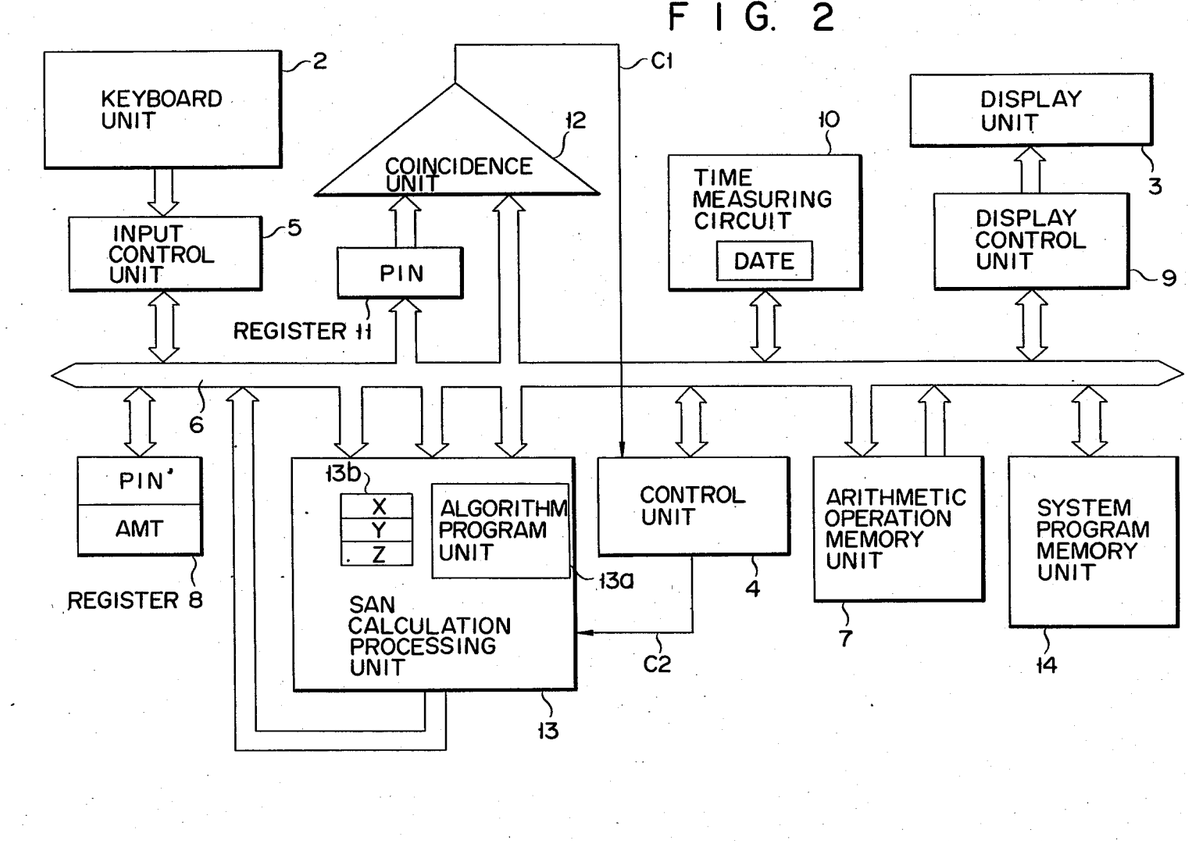
FIG. 2 is a block diagram of the identification card of FIG. 1.

FIG. 2 is a block diagram of the identification card 1. Data entered at a keyboard unit 2 is supplied to an arithmetic operation memory unit 7 through an input control unit 5 and a system bus line 6 under the control of a control unit 4 constituted by a microprocessor. The input data is written in a register 8 for temporarily storing a personal identification number (PIN') as secret data and a total amount (AMT) as transaction data. The arithmetic operation memory unit 7 is used when the identification card 1 performs a calculator function. The unit 7 stores data written therein and performs various types of arithmetic processing. The arithmetic operation data is displayed on a display unit 3 through the bus line 6 and the display control unit 9.

The bus line 6 is connected to a time measuring circuit 10 for measuring the current date and time, a PIN register 11, a coincidence unit 12, a sales approval number (SAN) calculation processing unit 13 and a system program memory unit 14 for storing a program for controlling the entire system.

The register 11 stores a PIN which is arbitrarily selected by a card holder upon issuance of the card and registered by the credit card company. The unit 12 compares the content of the register 11 with the PIN' stored in the register 8 and supplies a detection signal C1 to the unit 4. The unit 4 generates an identification enable signal C2 in response to the signal C1.

Upon reception of the signal C2 from the unit 4, the unit 13 starts operation by using the contents (PIN' and AMT) of the register 8 and the content (DATE) of the circuit 10 in accordance with the encryption algorithm specified by the credit card company and calculates specific encrypted data SAN. The unit 13 has an algorithm program memory 13a for storing the encryption algorithm and a calculation register 13b.

Since the card holder and the card having the arrangement are authenticated by the card itself, part of the system circuit of an authentication system (host computer) 40 installed in an issuer's center such as a credit card company will be described with reference to FIG. 3.

Figure 3:
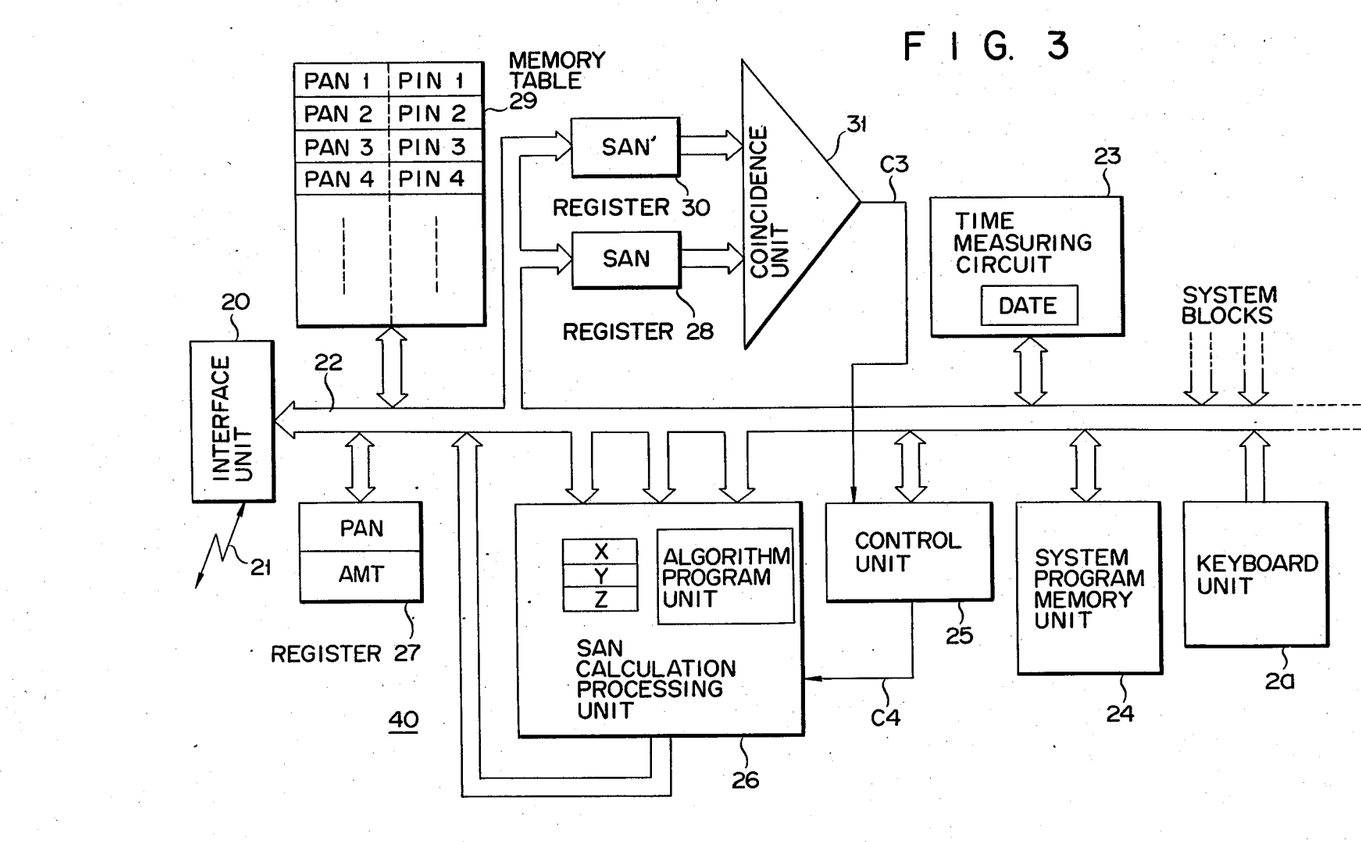
FIG. 3 is a block diagram of an identification card authentication system.

Referring to FIG. 3, an interface unit 20 converts data supplied through a communication line 21 such as a telephone line and sends the converted data onto a system bus line 22. At the same time, the data appearing on the bus line 22 is sent onto the line 21.

The bus line 22 is connected to a time measuring circuit 23, a system program memory unit 24 for storing a program for controlling the overall system and a control unit 25 for controlling the respective units in accordance with the program stored in the unit 24 in the same manner as in the identification card 1 of FIG. 2. The arrangement shown in FIG. 3 further has a SAN calculation processing unit 26 for encrypting the input data in accordance with the encryption algorithm (varying in different credit companies) specified by the given credit card company. The bus line 22 is also connected to a register 27 for temporarily storing data representing a total amount (AMT) which is externally supplied through the unit 20, and a card identification code representing a primary account number (PAN), and a register 28 for storing SAN calculated by the identification card 1. The line bus 22 is further connected to a memory table 29 for storing account numbers (PAN1, PAN2,...) of the respective customers and personal identification numbers (PIN1, PIN2,...) corresponding to the PANs and a register 30 for storing the SAN' calculated by the unit 26 in the computer 40. The data (SAN and SAN') stored in the registers 28 and 30 are compared with each other by a coincidence unit 31. The unit 31 supplies a detection signal C3 to the unit 25.

The authentication operation of the card holder and the card 1 by the card itself and by the computer 40 installed in a center of an issuer such as a credit card company will be described.

Figure 4:
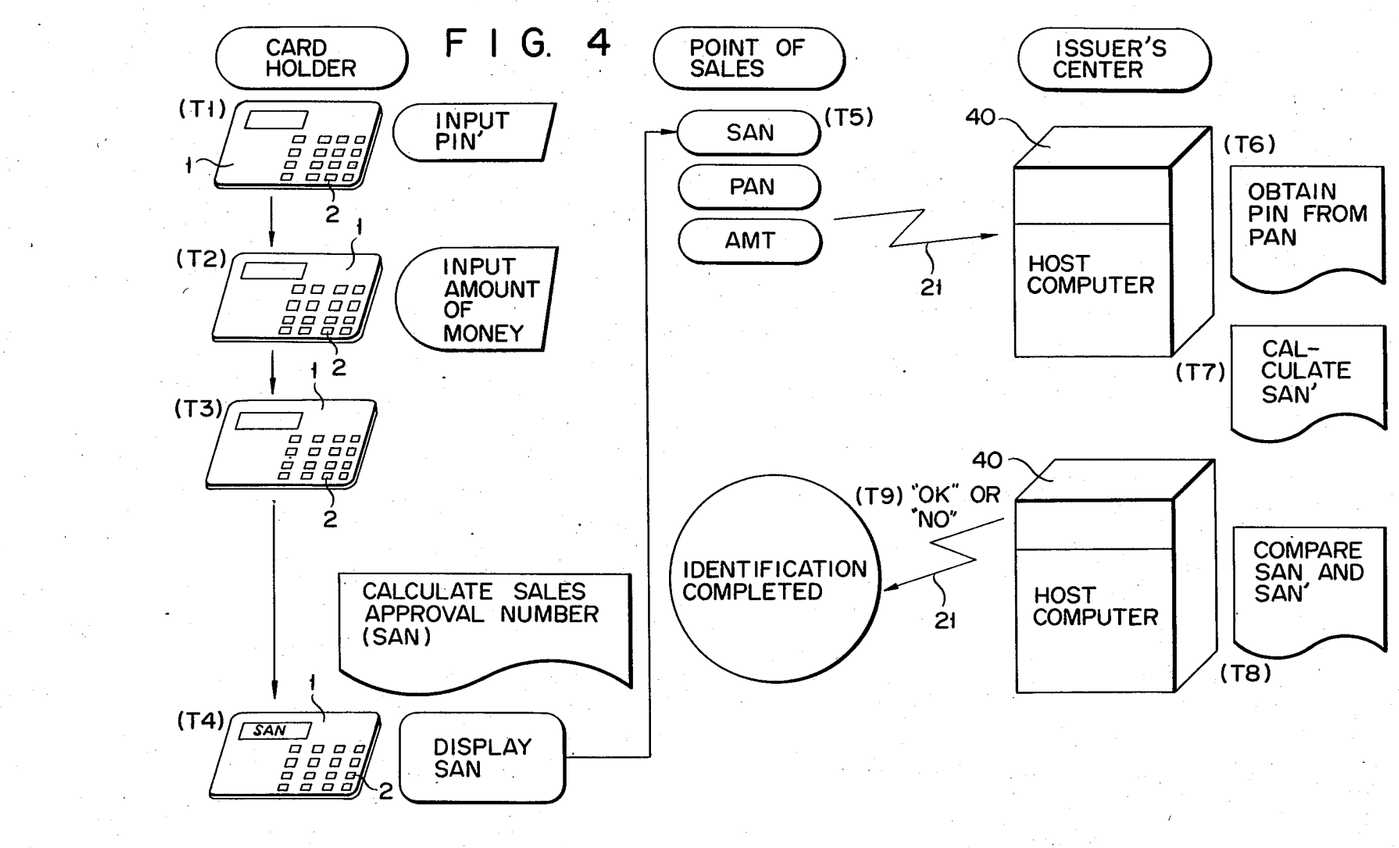
FIG. 4 is an illustrative representation showing card authentication procedures when a card holder purchases an item in a store.

FIG. 4 shows authentication procedures which consist of operation procedures by a card holder, a clerk of a point of sales (POS) such as a store, and the computer 40 installed in the center such as a credit card company.

A card holder brings a desired item to a cashier counter of the store and takes out his identification card. He enters his PIN' registered with the credit card company and contained in the card without being monitored by the cashier (T1) and depresses the CF key 2a. The entered data PIN' is supplied to the unit 12 and is compared with the data PIN stored in the register 11. The unit 4 writes the coinciding PIN' in the register 8 and causes the unit 3 to display the "OK" message. The card holder shows the indentification card 1 displaying "OK" to the clerk and after confirmation as legal card holder enters the total amount (AMT) of the desired item. He then depresses the CF key 2a again. The unit 4 writes the AMT in the register 8 and supplies the signal C2 to the unit 13.

In step T3, the unit 13 performs a predetermined calculation by using three data (i.e., PIN', AMT and DATE supplied from the circuit 10) in accordance with the specific encryption algorithm. A typical example of the encryption algorithm will be described with reference to the flow chart of FIG. 5A.

Figure 5A:
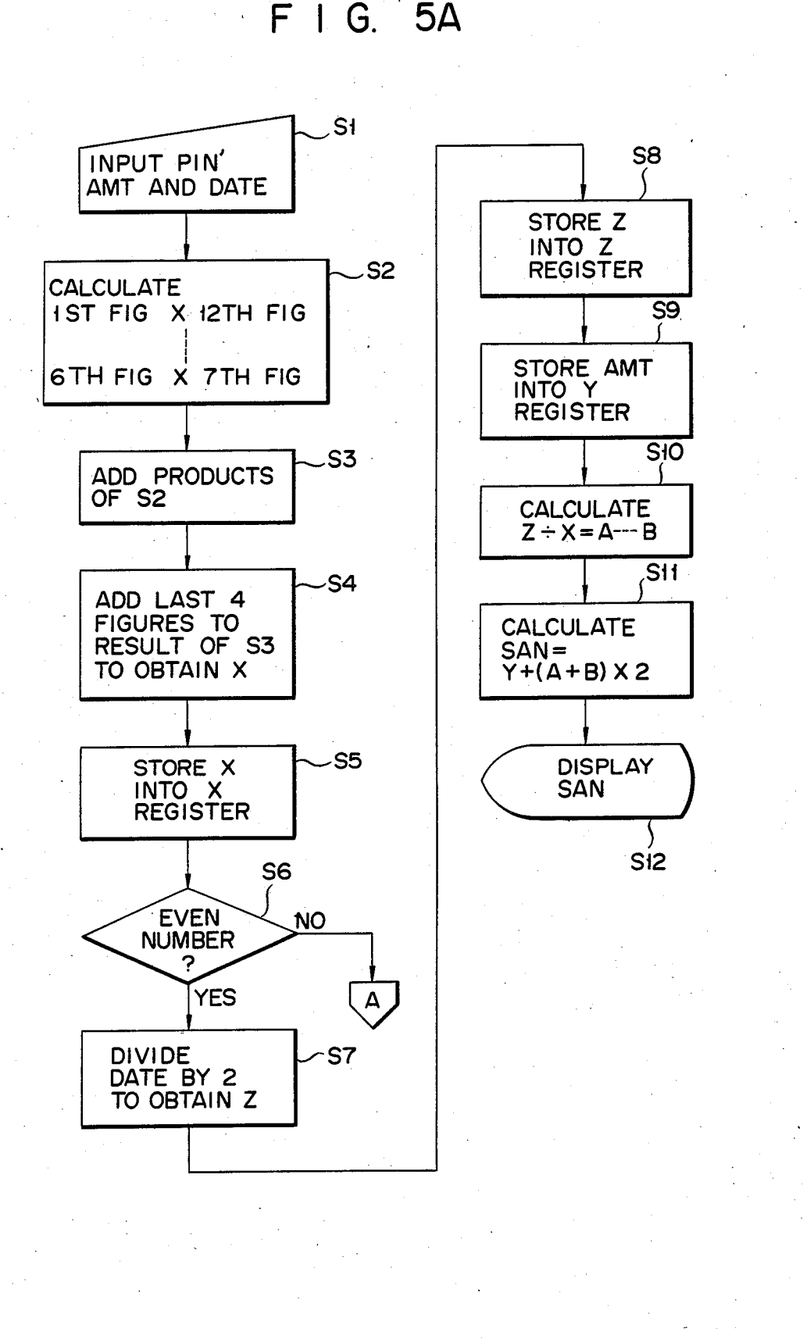
FIGS. 5A and 5B are flow charts showing encryption algorithms, respectively.

In step S1, the data PIN', AMT and DATE are fetched by the unit 13. It should be noted that the data PIN' represents a 12-digit numeric value. Processing of the input data PIN' is started.

In step S2, products of the first and 12th digits, the second and 11th digits, the third and 10th digits, the fourth and 9th digits, the fifth and eighth digits, and sixth and seventh digits of the data PIN' are calculated by the unit 13. In step S3, the six products calculated in step S2 are added to each other. In step S4, values of the last four figures (i.e., lowest four digits) of the data PIN' are added to the sum obtained in step S3. In step S5, the sum is stored as data X in the X register 13b in the unit 13.

The unit 4 checks in step S6 whether or not the value of the lowest digit of the current date (DATE) is an even value. If YES in step S6, the DATE is divided by 2 in step S7. The quotient is stored as data Z of the DATE in the Z register in the register 13b in step S8. In step S9, the AMT is stored in the Y register. A calculation is performed in accordance with the contents of the X, Y and Z registers in step 10 as follows:

$$Z \div X = A \text{ remainder} \ldots B$$

In step S11, the following calculation is performed to obtain data SAN:

$$SAN = Y + A + B$$

The data SAN is displayed on the unit 3 in step S12.

Figure 5B:
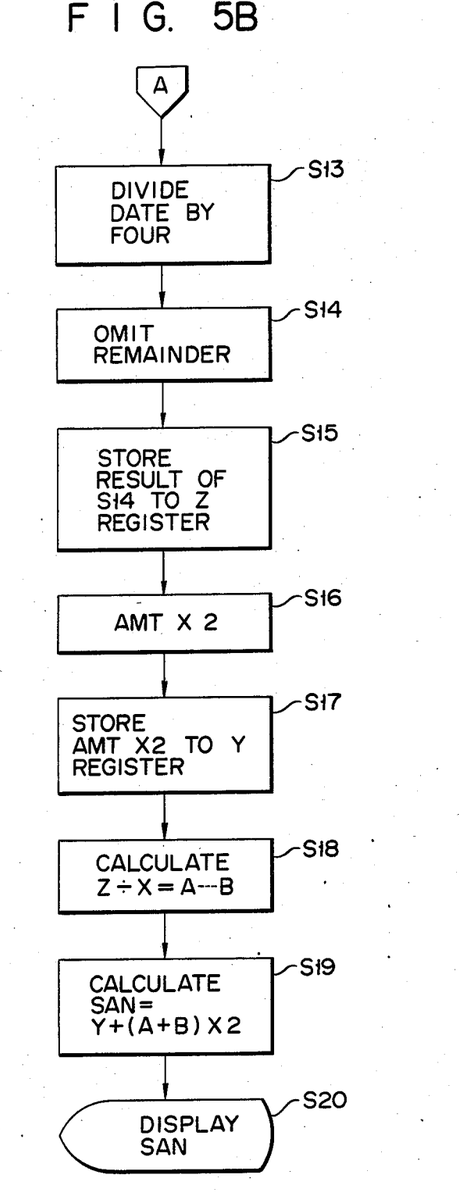

If NO in step S6, the flow advances to step S13 of FIG. 5B. The data DATE is divided by 4, and a resultant remainder is omitted in step S14. The quotient in step S14 is stored as data Z in the Z register (step S15).

The AMT is doubled in step S16, and the product is stored as data Y in the Y register in step S17.

The following calculation is performed in step S18:

$$Z \div X = A \text{ remainder} \ldots 8$$

The following calculation is further performed in accordance with the above calculation result in step S19:

$$SAN = Y + (A \times B) \times 2$$

The data SAN is displayed on the unit 3 (step S20).

In this manner, when the card holder enters the data PIN' and AMT on the card 1, the unit 13 calculates the encrypted data SAN, and the calculated result is displayed on the unit 3.

The card holder shows the card 1 displaying the data SAN to the cashier (step T4) and requests authentication of the card.

In step T5, the cashier confirms the credit card company of the card 1 shown by the customer and contacts the issuing credit card company with a telephone set installed in the terminal through the line 21. The cashier sends to the computer 40 the data SAN displayed on the card 1, the account number (PAN) as the card identification (i.e., card holder identification) code which varies in accordance with the card holder and embossed on the lower surface of the card 1, and the total amount AMT.

When the computer 40 receives the transmitted data described above, the following processing as shown in FIG. 4 is started.

The data (i.e., SAN, PAN and AMT) received through the unit 20 are written in the registers 28 and 27 in the computer 40. The memory table 29 is accessed in accordance with the received data PAN, and the data PIN corresponding to the input PAN is read out from the table 29 (step T6). Thereafter, the unit 25 in the computer 40 supplies a calculation start instruction signal C4 to the unit 26 which is then started. The unit 26 calculates data SAN' by using the three data (PIN, AMT and DATE) in accordance with the same encryption algorithm as that in the identification card (step T7). The data calculated in this manner is written in the register 30 and at the same time compared by the unit 31 with the data SAN transmitted from the store. The signal C3 from the unit 31 is supplied to the unit 25. The message data corresponding to the detection result, i.e., the "OK" message upon coincidence between the data stored in the registers 28 and 30, or the "NO" message upon noncoincidence between the data stored in the registers 28 and 30 is sent back to the store through the line 21 and the unit 20.

Upon reception of the response, i.e., the message data from the center, the cashier decides whether or not a transaction should be made for the current customer (step T9). When the response is the "OK" message and the SAN calculated by the card 1 coincides with the SAN' calculated by the computer 40, it is confirmed that:

(1) the PIN' entered at the card 1 is correct; the card user is the legal card holder, and (2) the algorithm stored in the card 1 coincides with that in the computer 40; the card 1 is authenticated as a card issued by the credit card company or the like.

When the cashier receives the "OK" message, he confirms that the card user is the legal card holder and that the card 1 itself is authenticated. The cashier can confidently proceed with the current transaction.

According to the embodiment described above, when a customer purchases an item in a given store by using the card 1, he can operate the keys on the card by himself, so that the card 1 calculates desired encrypted data (SAN: Sales Approval Number). The customer shows the desired encrypted data to the cashier to confirm card identification (i.e., that the card user is the legal card holder and the card was duly issued by the credit card company or the like). In this case, the encrypted data can be calculated by the card. A special device need not be installed in the store to identify the card. Only a telephone set is required.

Modified Embodiments

In the above embodiment, the encrypted data (SAN) is calculated by using three input data (i.e., PIN, AMT and DATE) in accordance with the encryption algorithm. The SAN calculation input data is not limited to the three data described above. For example, instead of the DATE or in addition to it, a sales item serial number (slip number) or the like may be entered to calculate specific encrypted data. The encryption algorithm shown in FIGS. 5A and 5B is an example for calculating encrypted data. The algorithm varies in accordance with different credit card companies.

In the above embodiment, the identification card has a keyboard and a liquid crystal display (LCD) unit and serves as a normal card as well as a calculator. A terminal connected to an external device may be arranged in place of the keyboard and the LCD unit. In this case, the card communicates with the external device (e.g., a device having a connector, a keyboard and a display) through the terminal of the card. The card may be powered through the terminal thereof.

In the above embodiment, the issuer's center such as the credit card company is directly called by the telephone set. However, a POS terminal on-line connected to the host computer of the center may be installed in a store, and data communication can be performed through the POS terminal.

In the above embodiment, the card authentication system is the host computer installed in a center such as a credit card company. However, the authentication system may be installed in the store, and the card holder and the card itself can be authenticated in the store.

In the above embodiment, the identification card is used in a store for the purchase of various items. However, when card holder or card authentication is required for a transaction made by a card, e.g., for mail order and ATM (Automatic Teller Machine) transactions or transactions utilizing automatic vending machines, the card holder and the card itself can be properly authenticated by using the identification card and the authentication system of the present invention.

According to the present invention as described in detail, the encryption algorithm approved by the credit card company is stored in the identification card, and upon sale of a desired item predetermined input data is encrypted in accordance with this encryption algorithm. The encrypted data is transmitted from the identification card to the host system of the credit card company through the proper means. The credit card company can check if the encrypted data is calculated in accordance with the authentic encryption algorithm, thereby determining that a transaction is made with an identification card approved by the credit card company.

According to the present invention, specific encryption of the predetermined data is performed within the identification card, and the authentication system installed in the credit card company or the store encrypts the predetermined data specified by the identification card and checks whether or not the data encrypted by the identification card coincides with that of the authentication system. As a result, the identification card and the holder are properly authenticated.

When a data transmission line connected to the authentication system is used to perform authentication of the card and its holder, secret data such as a personal identification number itself is not transmitted, but instead a corresponding key code is transmitted. Therefore, the personal identification number will not be intercepted through a communication line.

What is claimed is:

1. An identification card comprising:
   input means having a keyboard for entering secret data unique to a card holder and transaction data;
   calculating means for calculating encrypted data as a sales approval number (SAN) by using at least the secret and transaction data entered by said input means in accordance with a predetermined encryption algorithm; and
   display means for visually displaying the encrypted data calculated by said calculating means, whereby the card holder and a transaction with the card in a store are authenticated in accordance with said encrypted data.

2. A card according to claim 1, further comprising:
   a first memory means for storing the secret data entered by said input means;
   a second memory means for storing transaction data entered by said input means;
   a third memory means for storing key code data approved by an issuer upon issuance of said card;
   means for detecting a coincidence between the secret data stored in said first memory means and the key code data stored in said third memory means; and control means for receiving an output from said detecting means and supplying an enable signal to said calculating means.

3. A card according to claim 1, further including time measuring means for measuring a date, and wherein said calculating means includes the encryption algorithm for calculating the encrypted data in accordance with data representing the date as well as the secret data and the transaction data.

4. An identification card authenticaition system comprising:
an identification card means having input means for entering at least predetermined data which includes transaction data, first means for calculating first encrypted data by using said predetermined data including transaction data entered by a card holder in accordance with a predetermined encryption algorithm, and display means for dislaying the first encrypted data;
transfer means for transferring at least said first encrypted data displayed on said display means and transaction data to an external device; and
an authentication device means including second means for calculating second encrypted data by using data transferred by a transfer means in accordance with a reference enryption algorithm and measn for detecting a coincidence between the second encrypted data calculated by said second calculating means of said authentication device means and the first encrypted data calculated by said first calculating means of said identification card;
whereby the card holder and said identification card means are authenticated in accordance with the coincidence detected by said detecting means of said authentication device means.

5. A system according to claim 4, wherein the predetermined data entered by the card holder includes secret data registered at a card issuer by the card holder.

6. A system according to claim 4, wherein said input means of said identification card means includes a keyboard for enabling a card holder to enter the predetermined data, and display means for visually displaying encrypted data.

7. A system according to claim 4, wherein the predetermined data input by said input means of said identification card means further includs secret data registered at a card issuer by the card holder, the secret data being specified in said authentication device means in accordance with a card identification code assigned to said identification card means.

8. A system according to claim 4, wherein said authentication device means comprises:
first memory means for storing the predetermined data;
second memory means for storing the transaction data which are entered by said transfer means;
third memory means for storing the first encrypted data calculated by said identification card means;
means for obtaining a secret data of the card holder which forms part of the predetermined data;
said second means for calculating the second encrypted data calculates said second encrypted data by using the secret data, the predetermined data stored in said first memory means, and the transaction data stored in said second memory means in accordance with a predetermined encryption algorithm;
fourth memory means for storing the second encrypted data;
said coincidence detecting means detecting coincidence between the first and second encrypted data stored in said third and fourth memory means; and
means responsive to said coincidence detecting means for generating a coincidence result.

9. A system according to claim 8, wherein said means for obtaining the secret data of the card holder includes a memory table for storing secret data corresponding to the predetermined data.

10. A system according to claim 4, wherein:
said identification card means further includes first time measuring means for obtaining a date data, said calculating means calculating said first encrypted data in accordance with said predetermined data and date data measured by said first time measuring means; and
said authentication device means further includes second time measuring means for obtaining date data, said second calculating means calculating said second encrypted data in accordance with said transferred data and said date data measured by said second time measuring means.

11. A method for identifiying a card holder comprising the steps of:
comparing stored secret data unique to a card holder and input secret data entered from an input means provided in a card means, said stored secret data being previously stored in said card means;
entering transaction data from saidinput means when said stored secret data and input secret data coincide with each other;
calcualating in a first calculating means first encrypted data as a sales approval number (SAN) data in accordance with said entered transaction data and secret data;
transmitting from a point of sale to an issuer's center first encrypted data obtained from said first calculating means and transaction data;
calculating in a second calculating means at said issuer's center second encrypted data in accordance with transaction data sent forth from said point of sale and secret data previously stored;
comparing said first encrypted data transferred from said point of sale and said second encrypted data obtained from said second calculating means; and
transferring a resultant of comparison obtained in the comparing step to said point of sale.

12. A method for identifying a card holder according to claim 11, wherein said unique secret data is a personal identification number (PIN).

13. A method for identifying a card holder according to claim 12, wherein said first encrypted data calculating step further includes the step of displaying on a display means provided in said card means said first encrypted data calculated in said first calculating means.

14. A method for identifying a card holder according to claim 13, comprising transferring said first encrypted data and said transaction data to the issuer's center through a telephone line.

15. A method for identifying a card holder according to claim 13, comprising displaying on a display means a comparison result of said stored secret data and entered secret data from said input means.

* * * * *